United States Patent [19]

Adams

[11] 4,165,639
[45] Aug. 28, 1979

[54] FLOWMETER FOR LIQUIDS

[75] Inventor: Robert B. Adams, Tredyffin Township, Chester County, Pa.

[73] Assignee: Moore Products Co., Spring House, Pa.

[21] Appl. No.: 908,698

[22] Filed: May 23, 1978

[51] Int. Cl.$^2$ .............................................. G01F 1/32
[52] U.S. Cl. ................................................. 73/194 B
[58] Field of Search .............. 73/194 B; 137/804, 826, 137/839, 840, 842

[56] References Cited

U.S. PATENT DOCUMENTS

| | | | |
|---|---|---|---|
| 3,500,849 | 3/1970 | McLeod, Jr. | 137/842 |
| 3,640,133 | 2/1972 | Adams | 73/194 |
| 3,855,859 | 12/1974 | Adams | 73/194 |
| 4,085,615 | 4/1978 | Haefner | 73/194 |

*Primary Examiner*—Herbert Goldstein
*Attorney, Agent, or Firm*—Zachary T. Wobensmith, 2nd; Zachary T. Wobensmith, III

[57] ABSTRACT

A flowmeter for liquids is provided having a through passageway for the flow to be measured with a fluid interaction chamber and feedback means to provide an oscillation of the flow. The frequency of this oscillation is linearly and proportionally related to volume rate of flow and is independent of all fluid properties in the turbulent range, i.e., the frequency for a given volume flow rate will be the same for any liquid as long as the flow is turbulent. Provisions are made for detecting this oscillation and a sensor is provided which is responsive to changes in the heat transfer rates to the surrounding media. Vent means is provided communicating with the feedback means for venting gaseous material from the feedback passageways so that the flowmeter can be mounted and operate properly in a vertical pipe section.

3 Claims, 3 Drawing Figures

FLOWMETER FOR LIQUIDS

BACKGROUND OF THE INVENTION

1. Field of the Invention

The present invention relates to flowmeters for liquids utilizing the principles of pure fluid amplifiers in which a frequency is established corresponding to a particular flow, the frequency being measured to determine the flow, and the flowmeter having a wider range of usefulness than heretofore.

2. DESCRIPTION OF THE PRIOR ART

In my prior U.S. Pat. Nos. 3,640,133 and 3,855,859, flowmeters are provided in which a through passageway is provided for the flow to be measured with a fluid interaction chamber and feedback means associated with the chamber to provide an oscillation of the flow whose frequency in linearly and proportionately related to volume rate of flow. Those flowmeters were satisfactory for measuring the flow of gases in any orientation of the flowmeter but were not satisfactory for measuring liquid flow if mounted in a vertical pipe section because gases and vapors could become entrapped in the lobes of the feedback passages. The entrapped gases would influence the quality of the sensor signal by making it noisy and thus, in turn, would cause an erroneous signal output.

SUMMARY OF THE INVENTION

In accordance with the present invention, a flowmeter for liquids is provided with through flow and suitable for vertical orientation and having provisions for setting up a frequency proportional to volume flow rate, the flow being turbulent and subsonic, with passageways shaped to provide minimum permanent pressure loss and the maximum possible frequency and with provisions for preventing the entrapment of gaseous material which could adversely affect the sensor signals.

It is the principal object of the invention to provide a flowmeter for liquids in which a frequency proportional to volume flow is set up without moving parts and the frequency is advantageously detected in a location where turbulence and noise are reduced, which can be used in vertical pipe sections, or horizontally, as desired, and in which the measurement is made available as either a digital or analog signal, and with capability of greater force application for better feedback.

It is a further object of the invention to provide a flowmeter for liquids which can be employed in a vertical or horizontal liquid flow line without interposing any substantial resistance to fluid flow.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which.

Figure 1:
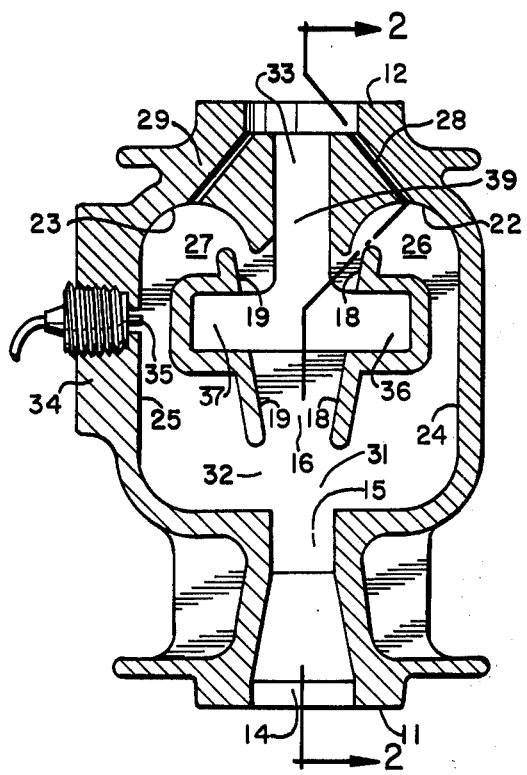
FIG. 1 is a vertical longitudinal sectional view of a flowmeter in accordance with the invention, vertically disposed, and taken approximately on the line 1—1 of FIG. 2.
Figure 2:
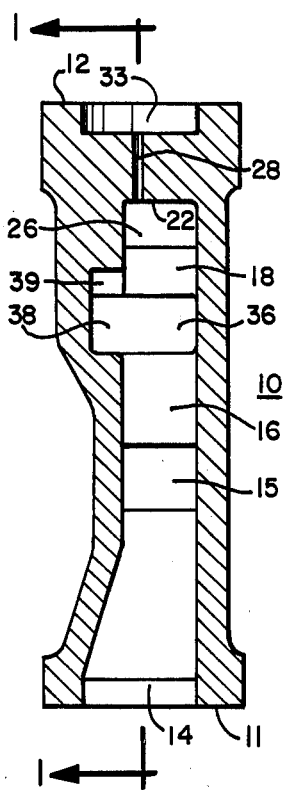
FIG. 2 is a vertical longitudinal sectional view taken approximately on the line 2—2 of FIG. 1.
Figure 3:
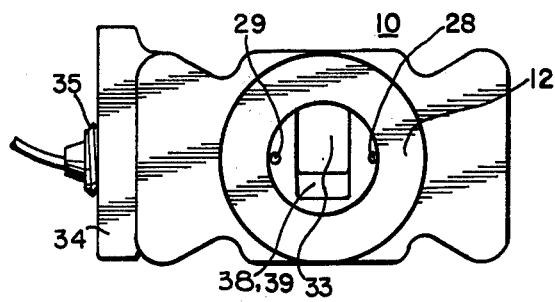
FIG. 3 is a top plan view of the flowmeter of FIGS. 1 and 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a body 10 is provided, which may be made of any desired construction such as by casting or molding, and of any desired material in accordance with the field of use, and which is preferably of material inert to the liquid whose flow is to be measured.

The body 10 may be horizontally disposed but is also suitable for vertical mounting in a pipe with its entrance end at the bottom and its delivery end at the top.

The body 10 has exterior end mounting faces 11 and 12 and a lower inlet opening or passageway 14 for the supply of the liquid whose flow is to be measured, in communication with a nozzle 15 for introducing the liquid in jet form into an interaction or steering chamber 16 which is aligned with the nozzle 15. The chamber 16 has diverging side walls 18 and 19 onto either of which fluid from the nozzle 15 may lock, as hereinafter explained.

The side walls 18 and 19 have therebeyond curved walls 22 and 23 which provide, with the walls 18 and 19 and with side walls 24 and 25, feedback paths 26 and 27 on each side of the chamber 16.

The side walls 22 and 23 are provided with vent passageways 28 and 29 for discharge of gaseous material, including air and other gases and vapors carried with the liquid whose flow is to be measured. Control nozzles 31 and 32 on each side and at the inner terminal of the nozzle 15 provide for communication of the feedback paths 26 and 27 with the chamber 16.

The chamber 16 also has an upper discharge or delivery passageway 33 aligned with the nozzle 15 and extending to the end face 12 and with which the vent passageways 28 and 29 are in communication. The areas of the vent passageways 28 and 29 are preferably in the range of one tenth to one twentieth of the cross sectional areas of the feedback paths 26 and 27.

At a selected location within the body 10 and preferably in one of the feedback paths, such as the feedback path 27, a fluid movement detector 35 is provided for transmitting pulses responsive to oscillations of fluid within the body 10 in the feedback path 27.

The detector 35 carried in a boss 34 can be as shown in my prior U.S. Pat. Nos. 3,640,133 and 3,855,859 and with suitable circuitry for providing an analog signal for indicating, recording or controlling the fluid flow, and with provisions for counting, if desired, to indicate the total volume passed through the flowmeter.

The diverging side walls 18 and 19, intermediate their ends, and upstream of the walls 22 and 23 can, if desired, have recessed regions 36 and 37 connected by a transverse equalizing passageway 38 and with a relief passageway 39 extending along and communicating with the passageway 33 as shown in my prior U.S. Pat. No. 3,855,859.

The mode of operation will now be pointed out.

Assume that the body 10 is disposed horizontally with the feedback paths 26 and 27 in the same horizontal plane then the flowmeter will operate as pointed out in my prior U.S. Pat. No. 3,855,859.

If the body 10 is disposed vertically with the lower end mounting face 11 at the bottom and the upper end mounting face 12 at the top then the flowmeter herein disclosed will operate satisfactorily in a manner not heretofore available.

With the body 10 disposed vertically assume that liquid is supplied through the liquid inlet opening 14 and through the nozzle 15 into the interaction chamber 16. If the liquid jet entering the chamber 16 from the nozzle 15 is in the position such that it is attached to the wall 18 a portion of this jet guided by curved wall 22 will enter feedback path 26 and flow toward control nozzle 31. At this time, because of the counterclockwise circulation of the flow in the chamber 16 and the converging shape at the passageway 33 there is a very little tendency, if any, for flow to occur in the feedback path 27. When the flow occurs in feedback path 26, it exits the control nozzle 31 and deflects the jet from the nozzle 15 toward the wall 19. However, because the jet from the nozzle 15 just after this occurrence is still moving along the wall 22 the feedback which produces the back flow along the path 26 continues for a time after the initial switching action so as to insure a complete and positive switching of the entire jet from the nozzle 15 to the wall 19.

After the jet is completely attached to the wall 19 it feeds liquid guided by the curved wall 23 back through the feedback path 27 and back toward control nozzle 32 where it will act to return the jet from the nozzle 15 toward the side wall 18.

Any gaseous fluid, including air, gases or vapors, separating from the liquid and separating and tending to collect or be trapped in the feedback paths 26 and 27 is discharged through the vent passageways 28 and 29 to the delivery passageway 33. The adverse effect of trapped gaseous fluid does not therefore affect the sensor signal and an erroneous output signal is avoided.

I claim:

1. A flow sensitive device comprising
    a housing providing a liquid inlet nozzle having a connection to a source of liquid for producing a liquid jet,
    an interaction chamber for receiving said jet,
    said interaction chamber having a liquid delivery passageway opposite to and aligned with said nozzle,
    said interaction chamber having diverging wall members for alternate attachment of said jet,
    said interaction chamber having on opposite sides of delivery passageway openings aligned with said diverging wall members,
    feedback passageways communicating with said openings and with oppositely disposed control ports communicating with said chamber contiguous to said nozzle,
    said openings receiving a portion of the jet attached to the adjacent side wall with which it is aligned and delivering said portion to said opening for detaching said jet from said adjacent side wall and causing it to attach to the opposite side wall thereby providing a cyclic oscillation of the jet between said diverging walls,
    the period of said cyclic oscillation being principally proportional to the interval of each cycle from the time the jet is first deflected toward one of said diverging walls and the time a portion of the jet reaches the opening aligned with said diverging wall,
    a member responsive to said cyclic oscillation for transmitting a signal related thereto, and
    ducts connected to said feedback passageways intermediate said openings and said control ports and communicating with said fluid delivery passageway for venting gaseous material from said feedback passageways to said liquid delivery passageway.

2. A flow sensitive device as defined in claim 1 in which
    said housing is substantially vertically disposed with its supply connection downwardly disposed and its fluid delivery passageway upwardly disposed.

3. A flow sensitive device as defined in claim 1 in which
    the area of each of said ducts is in the range from one tenth to one twentieth of the areas of said feedback passageways.

* * * * *

UNITED STATES PATENT OFFICE
CERTIFICATE OF CORRECTION

Patent No. 4,165,639          Dated August 28, 1979

Inventor(s)   Robert B. Adams

It is certified that error appears in the above-identified patent and that said Letters Patent are hereby corrected as shown below:

Column 4,
  Line 21, after "interval", "of" should be - in - .

Signed and Sealed this

Twenty-seventh Day of November 1979

[SEAL]

Attest:

RUTH C. MASON
Attesting Officer

LUTRELLE F. PARKER
Acting Commissioner of Patents and Trademarks